(12) United States Patent
Reintjes et al.

(10) Patent No.: US 6,912,308 B2
(45) Date of Patent: Jun. 28, 2005

(54) APPARATUS AND METHOD FOR AUTOMATIC FORM RECOGNITION AND PAGINATION

(75) Inventors: Peter B. Reintjes, Boca Raton, FL (US); Shane D. Mattaway, Boca Raton, FL (US); Nicholas G. Bethmann, Boca Raton, FL (US)

(73) Assignee: Targus Communications Corp., Boca Raton, FL (US)

( * ) Notice: Subject to any disclaimer, the term of this patent is extended or adjusted under 35 U.S.C. 154(b) by 425 days.

(21) Appl. No.: 09/728,538

(22) Filed: Dec. 1, 2000

(65) Prior Publication Data

US 2002/0067854 A1 Jun. 6, 2002

(51) Int. Cl.⁷ .................................................. G06K 9/22
(52) U.S. Cl. ...................................... 382/181; 382/315
(58) Field of Search ................................. 382/100, 181, 382/186, 187, 313, 314, 315; 715/507, 508, 541; 178/18.01, 18.03

(56) References Cited

U.S. PATENT DOCUMENTS

| | | | |
|---|---|---|---|
| 4,759,075 A | | 7/1988 | Lipkie et al. |
| 5,243,149 A | * | 9/1993 | Comerford et al. ...... 178/18.03 |
| 5,325,447 A | | 6/1994 | Voit, III |
| 5,410,611 A | | 4/1995 | Huttenlocher et al. |
| 5,442,715 A | | 8/1995 | Gaborski et al. |
| 5,537,489 A | | 7/1996 | Sinden et al. |
| 5,544,259 A | | 8/1996 | McCubbrey |
| 5,587,560 A | * | 12/1996 | Crooks et al. ........... 178/18.03 |
| 5,627,349 A | * | 5/1997 | Shetye et al. ............ 178/18.01 |
| 5,629,499 A | * | 5/1997 | Flickinger et al. ....... 178/18.01 |
| 5,734,129 A | * | 3/1998 | Belville et al. ........... 178/18.03 |
| 5,892,842 A | | 4/1999 | Bloomberg |
| 6,021,218 A | | 2/2000 | Capps et al. |
| 6,050,490 A | * | 4/2000 | Leichner et al. ........ 235/462.49 |
| 6,064,751 A | | 5/2000 | Smithies et al. |
| 6,259,043 B1 | * | 7/2001 | Clary et al. ............. 178/18.01 |
| 6,456,740 B1 | * | 9/2002 | Carini et al. ................ 382/187 |
| 6,782,144 B2 | * | 8/2004 | Bellavita et al. ............ 382/310 |
| 2002/0146170 A1 | * | 10/2002 | Rom .......................... 382/175 |

\* cited by examiner

*Primary Examiner*—Jon Chang
(74) *Attorney, Agent, or Firm*—Jose Gutman; Fleit, Kain, Gibbons, Gutman, Bongini & Bianco P.L.

(57) ABSTRACT

A pen-based system that automatically identifies either single page or multi-page forms when data is a written on paper copies of the form. The system captures pen stroke data as an untrained user fills out the paper form attached to its surface. The sequence and location of the raw pen-stroke data is analyzed to determine which form the user was filling out and which field on each page was the intended field for the subsets of stroke data. The form/field identification method allows the electronic clipboard to be used as if it were an ordinary clipboard. One of several single or multi-page forms in the selected, and attached to the clipboard without any special attention to its positioning. The user can fill out fields in any order skipping between pages at will, leaving fields blank, etc. and having no other interaction with the clipboard.

36 Claims, 7 Drawing Sheets

APPARATUS AND METHOD FOR AUTOMATIC FORM RECOGNITION AND PAGINATION

BACKGROUND OF THE INVENTION

1. Technical Field

The present invention relates to pen-based computer systems. In particular, it relates to a method and apparatus for detecting pen strokes written on a paper form by an individual and automatically determining the correct form by analyzing the pen strokes of a writer.

2. Background Art

There are many procedures for which the first step is an individual filling out a paper form. In most situations, the data written on the form will ultimately be input to a computer system. Historically, this has required a labor intensive two-step procedure in which a first individual fills out a form, and then a second individual enters that data into a computer database.

The development of compact high-performance computers has resulted in many new applications which heretofore were not feasible due to their demand on system resources. One such application is the pen-based, or tablet, computer. Pen-based computer applications are particularly useful in mobile environments, especially where form data is used. For example, businesses such as delivery services which previously used paper forms can now use a pen-based tablet computer to hold a paper form, and to electronically capture the data as the user fills out the form. In this type of application, the system would normally keep a copy of the form image separate from the data input by the user. This allows the input data to be more conveniently stored and/or transmitted. The development of pen-based computers has allowed data written on a form to be directly stored in a computer rather than having to take a second step to transfer the data originally written on a paper form into a computer. However, pen captured data still requires optical character recognition (OCR) software to convert the pen stroke data captured by the pen-based computer to usable data.

The next step was the development of multi-page electronic documents. This type of document may, for example, be a patient questionnaire used by physicians to obtain basic health data from a patient, or any other application which requires multiple page forms. However, as the size of a multiple page document increases, determining which page within a document an individual is currently completing becomes more difficult. One difficulty associated with multiple page documents on tablet computers is caused by the need to identify which page in a multi-page electronic form is being filled out by an individual. It would be desirable to have a method of automatically identifying the form and individual pages so that data input by an individual could be automatically associated with the correct page of the correct form.

Another disadvantage to the prior art is that it requires explicit manual steps to initialize the data-gathering phase. For example, if a multi-part form is being used, the form must first be carefully aligned on the tablet or a registration procedure must be executed to instruct the tablet computer regarding the exact form placement. Then the specific form must be identified to the computer system. Once the form is identified, the current page must be identified whenever the user moves from one page to another in a multi-page form. As can be seen, this is a labor intensive process which is prone to error.

Unfortunately, these operations are clearly unsuitable for untrained users for the following reasons. First, there is little control over how carefully the person aligns the form. Second, we cannot ensure that an individual is taught how to identify forms or ensure that the form identification has taken place. Finally, it is not possible to ensure that an individual can be taught how to select pages or ensure that the person correctly re-selects the correct page every time they skip backwards or forwards within a multi-page form. As a result, even though electronic entry of data from forms has been developed, the process of electronically entering data written on forms has numerous disadvantages.

While addressing the basic desirability of using electronic, rather than paper forms, the prior art has failed to provide a multi-page electronic forms system which is capable of automatically identifying a form without an individual actively taking some step or steps to identify it.

SUMMARY OF THE INVENTION

The present invention solves the foregoing problems by providing a pen-based system that automatically identifies either a single page form or a page within a multi-page form when data is a written on paper copies of the form. The system identifies the form by identifying the area of the form on which data is written. Identification is accomplished by associating the location of pen strokes entered on the form with proper fields on the form. The system matches the location of the pen strokes input by the user with data input fields on the form that most likely match the location of the pen strokes. In one embodiment, an electronic clipboard captures pen stroke data as an untrained user fills out a form attached to its surface. The sequence and location of the raw pen-stroke data is analyzed to determine which form was filled out and which field on each page was the intended field for the subsets of stroke data. The form/field identification method allows one to use the pen-based computer as if it were an ordinary clipboard. An individual can select one of several multi-page forms, attach it onto the pen-based computer without any special attention to its positioning, fill out fields in any order, skipping between pages at will, leaving fields blank, etc. and having no other interaction with the clipboard. The resulting data is then analyzed to determine the identity of the form that was filled out by the user. The preferred embodiment uses an electronic pen that also writes normally in ink or pencil, which allows data entered by the user to be captured without requiring any additional effort from the user. In fact, the user might be unaware that the clipboard is an electronic device. Later, the collected form data can be properly superimposed on stored form template images for display.

DESCRIPTION OF THE PREFERRED EMBODIMENT

Prior to a discussion of the figures, a general overview of the features and advantages of the invention will be presented. The present invention relates to streamlining the process of bringing data, which is written onto forms via pen strokes, into a computer system without requiring changes to the well-established practice of having untrained persons fill out paper forms.

Tablet computers capture data by placing a form on an electronic clipboard and then using an electronic pen that also writes normally in ink to complete the form. As the form is filled out, the data is captured without requiring any additional effort from the user. In fact, the user may even be unaware that the clipboard is an electronic device. During the initial data gathering phase, where the user is entering raw data, there are no special computational requirements. The invention provides advantages in the postprocessing of the raw data by identifying which form was filled out by the user, by associating the user entered raw data with the proper fields of the form, and by compensating for some degree of misalignment of the form on the clipboard.

The prior art approaches to solving these problems required explicit manual steps prior to allowing the user to fill out the form. For example, the form typically is carefully aligned on the tablet, or a registration procedure, such as touching the electronic pen to the upper left and lower right corners of the form would be executed to inform the tablet computer of the exact form placement. Once the placement of the form has been determined, the specific form may be identified by a variety of known techniques.

Likewise, when multi-page forms are used, the current page would be identified when the user moves from one page to another. Of course, the prior art operations described above are clearly unsuitable for untrained users, because they may not properly align the form on the tablet computer, they nay not know how to identify the form or how to an ensure that form identification has occurred, and they may not correctly select pages when they skip backward or forward within a multi-page form.

The principal embodiment of this invention is used in conjunction with an electronic clipboard (i.e. a tablet computer) consisting of a paper form on top of a digitizing tablet. The user fills out the form without regard to the fact that the system is also storing an electronic copy of the handwritten data. The preferred embodiment of the invention is a pen-based computer system which allows the system to identify and select a particular form based on the areas of a page or a multi-page paper document being filled out by an individual. This feature allows the user to enter data in the conventional manner on a paper form.

Figure 1:
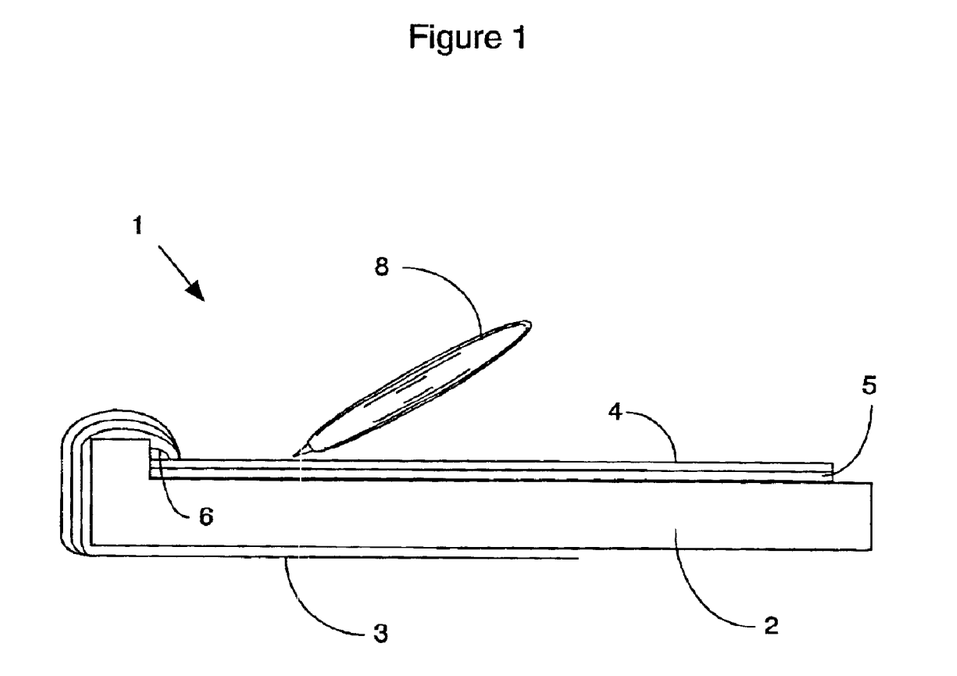
FIG. 1 is a side edge view of a prior art tablet computer which illustrates a pen-based computer that holds a multi-page form.

The present invention takes simultaneous advantage of differences between forms and differences between pages. In particular, the fact that data fields are typically located on different places on different forms allows the system to detect the correct form based on the position of the input data fields. Furthermore, the method used to do this, which is presented below, allows for the possibility that page alignment may be different for each page, or each field, if they are filled out of sequence. For example, if a person fills out a two-sided form by filling out half of the first page, flipping the page over on the clipboard and filling it out, then flipping back to the first page to complete the form, three possible page alignments must be calculated. In fact, the method described can even handle the case in which page alignment is shifted between any entries. The invention accomplishes this as follows:

Referring to FIG. 1, this figure shows a side edge view of a pen-based computer 1 holding a multi-page form 3-4. The tablet computer 2 has a digitizing grid device 5 on its upper surface. In multi-page form 3-4, form 3 is folded over the end of tablet computer 2. The unused page 4 of the multi-page form 3-4 lies on top of the digitizing grid device 5. When the user fills out the unused page of multi-page form 4 with pen device 8, then the user's pen strokes are detected by the digitizing grid device 5 and their position is used to identify what area on the form is being written on, and from that location data the system determines which form is being used.

Figure 2:
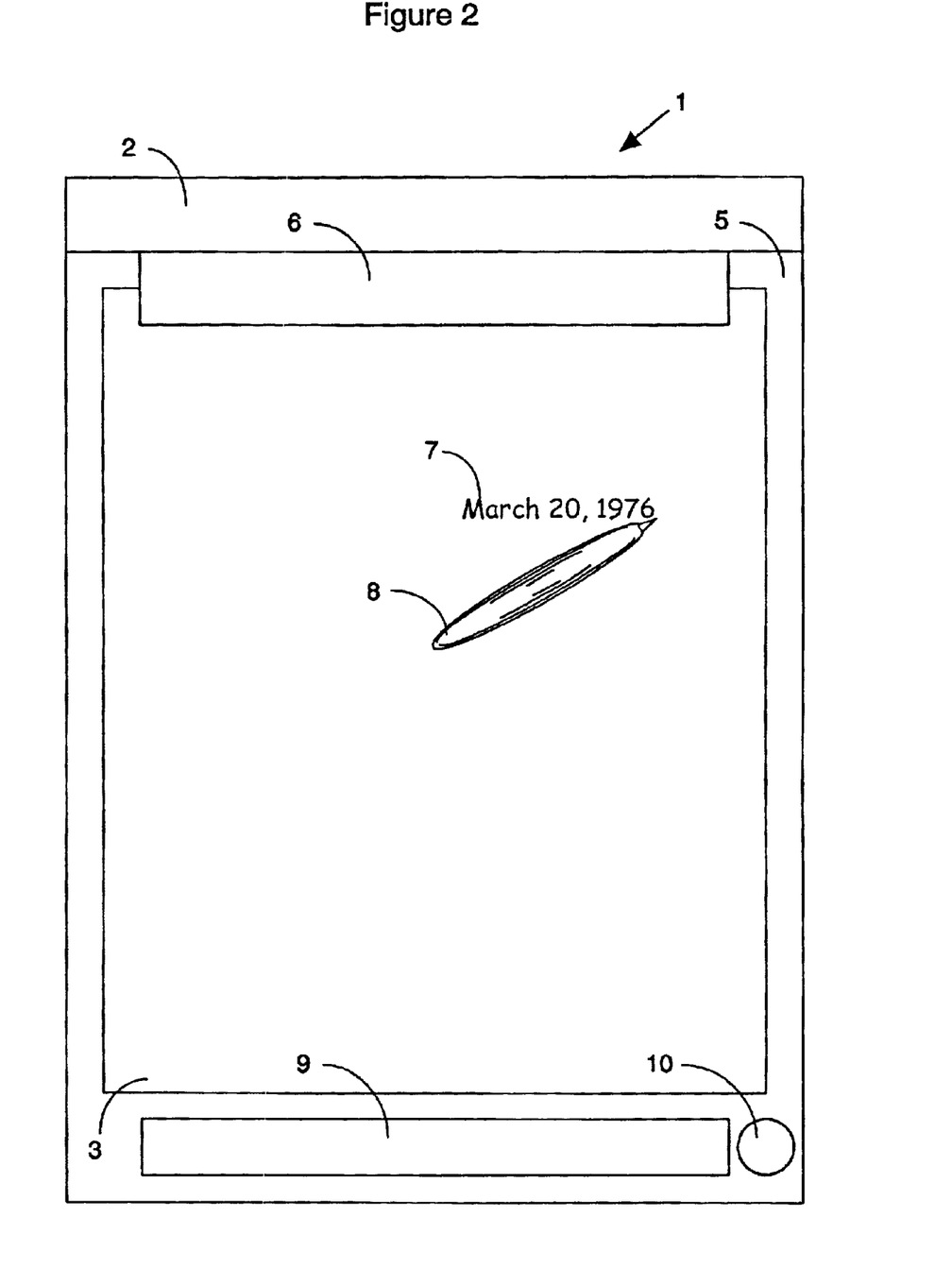
FIG. 2 is a top view of a preferred embodiment of the invention which illustrates a pen input device filling in a text field of a form.

In FIG. 2, a top view of the preferred embodiment of FIG. 1 is shown. The tablet computer 2 is shown securing, via optional clip 6, the filled in pages of multi-page form 3 to the digitizing grid device 5. Text input data 7 is being written by pen device 8. As the text input data 7 is written, digitizing grid device 5 detects the movement of the pen device 8 and generates an electronic representation of those movements. Digitizing grid devices 5 and their associated pen devices 8 are well-known in the art.

When the raw stroke data from the pen device 8 has been transferred to the tablet computer 2, the only information we have about this collection of data is that "someone filled out a form at a particular time." There is, however, much more information that can be obtained from the pen stroke data.

People generally fill out forms from top to bottom and from page 1 to page N in order. This behavior cannot be depended on entirely because of variations in an individual's behavior. However, it is possible to exploit this behavior without depending upon it completely. For example, address and name fields contain collections of short strokes with certain characteristics (printed letters) and numeric fields (SS#, zip codes etc.) that can be identified as such in many cases. In this case, the content of the data, as well as its location, can be used to make decisions regarding the form. If there are check boxes or circled entries (e.g. Sex M/F), they can be used as reliable indicators of which page is being used as well as the forms paper alignment on the clipboard. For the purposes of this discussion, data that can be identified based on the foregoing characteristics will the referred to as "content identifiable data."

This user input data can be used to identify the particular form and to separate the pen strokes that correspond to the fields on each particular page. Those skilled in the art will recognize that the accuracy of this approach is affected by the number of possible forms and the number of pages in the longest form. It may work very well for three to five different forms of less than four pages, while being impractical for selection between hundreds of forms with dozens of pages. However, most applications do not require a large enough number of forms that the similarity between forms would inject an element of ambiguity as to which is the correct form. Even if this were the case, it would be a simple matter to redesign the forms to avoid data field conflicts.

It is also possible to train the system in relation to a particular form. If a sample form is filled out several times in a training session, this could provide enough information for later alignment and parsing of data with a high degree of accuracy. Alternatively, a more extensive process of setting up forms by identifying fields, types of data, and the corresponding database inserts associated with post processing can make up for uncertainties in parsing the raw data. As a last resort, designing fault-tolerant form layouts may be the best approach to eliminating errors. The simplest example of this would be to have at least on required field on each form which did not overlap any other fields on the other forms.

To be fault tolerant in the case of a user who does not complete forms in a linear fashion (i.e. the user skips around between pages while filling out the form), or who leaves required fields empty, the forms should preferably be designed such that the individual field locations within the form are unique when compared with the other forms used by a particular application. Another concern is that the user may even shift the pages on the clipboard while filling out the form. In this situation, the post-processing software may need to automatically re-register the page on a field-by-field basis when an apparent error is detected.

The process of identifying fields, and thereby identifying forms, begins by isolating blocks of writing and calculating a box around this writing for each of these blocks. Each block of writing is assigned to one of the fields in the total set of fields from all pages of all forms with the following requirements: first, no two overlapping blocks of writing can be assigned to the same field; second, all of the assigned fields must belong to the same form; and last, the linear distances between the corresponding corners of data bounding boxes and field bounding boxes should be minimized.

Processing overhead can be reduced as follows: if the text boxes and field bounding boxes perfectly match a form, then processing can terminate at that point and that form can be selected.

Figure 3:
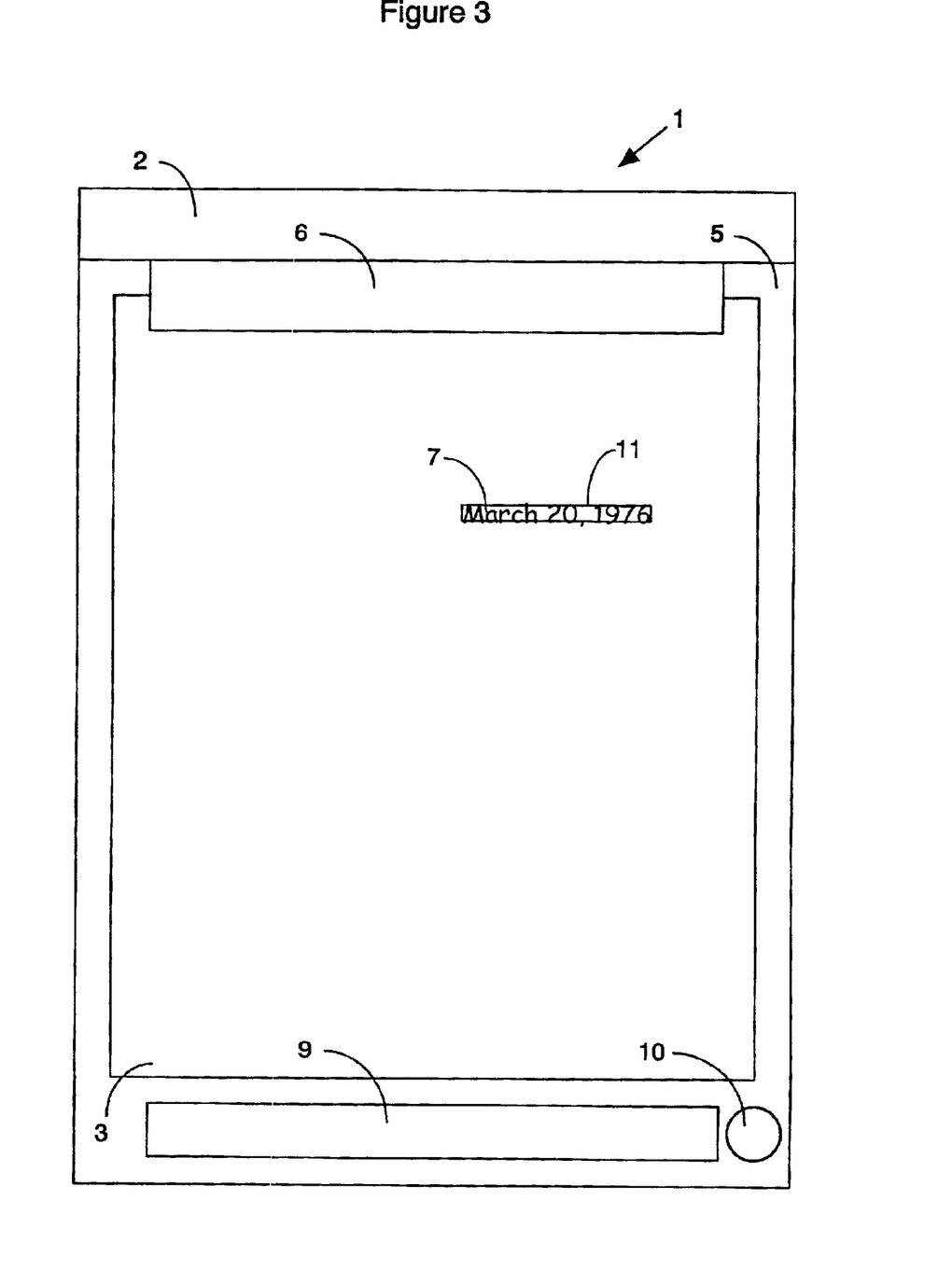
FIG. 3 is a top view of a preferred embodiment of the invention which illustrates a boundary box calculated for a text field.

The boundary box 11 is illustrated in FIG. 3. As can be seen, when the pen device 8 is used to enter data 7 via pen strokes on digitizing tablet 5, the system determines the perimeter borders of the text data to create a boundary box 11. Of course, the boundary box 11 is shown on this figure for illustrative purposes, but it is actually created in the host computer during post processing and does not appear on the form or the digitizing tablet.

Matching the text boundary boxes to form fields would be performed as follows. In the preferred embodiment, the search for an optimal assignment (i.e. when the field is identified) is terminated when the sum of distances between fields and data blocks falls below a predefined threshold. Further, the search will be guided by the following principles which take advantage of field placement and assume that users will generally, but not necessarily always, fill out the form pages in the obvious order. The steps to accomplish this use the following general rules:

1— Geographical Selection Rule

Limit initial comparisons to fields in the same region of the page as the selected data blocks (top, middle, bottom).

2— Temporal Selection Rule

After finding a good field/block match and if the next temporal block of data is lower on the page or to the right of the previous matched block, begin by considering the next field on the same page of the same form as the field just matched. Begin alignment determination by considering zero rotation and zero X, Y offset relative to the alignment for the previous field.

3— Same Page/Next Page Rule

More generally (than step 2, above) each good match on a page will increase the probability that the next field down the page should be matched with a field on the same page and that a following data block at the top of a page will be best matched using the page immediately following the page containing a previous good match near the bottom.

4— Same Form Rule

Each good match with a field in a given form will reduce the consideration of any fields in other forms with the exception that only a series of significantly bad matches will then allow for the consideration of alternative forms.

With these rules in mind, the process of form identification begins by isolating blocks of writing. This process is entirely different from prior art form processing systems which operate on scanned bitmaps of forms. In the prior art systems, the elements of writing must be separated from the template printed on the form and then they must be separated from each other in order to send them to a handwriting recognition system. That process is entirely different from the method implemented by the invention. In the present invention, the input data is pen stroke data representing the data entered by the user and there is no form data to be deleted.

The first part of the preferred embodiment is to isolate the segments of handwriting from each other and to identify the form and page to which these data items belong. First, the system creates an empty stroke collection which is a data structure containing a stroke list, and average character height and width and a bounding box. If this is the first stroke collection, the system will set a reasonable starting value for average character width, and then set a reasonable starting value for average character height. On the other hand, if this is not the first stroke collection, then the system takes these values from the previous, stroke collection.

Next, the system sets the current position to the position of the first input stroke and adds the first stroke to the stroke collection. Subsequent strokes are added to the stroke collection until: a) The X position of the next stroke is significantly less than the X position of the previous stroke and the Y position of the next stroke is different by plus or minus 80 percent of the current average character height (e.g. this is probably an indication of a move to a new line); or b) The X position of the next stroke is significantly more than the X position of the previous stroke (e.g. probably an indication of a move to a new field on the same line).

During this process, the system also continuously recalculates average character height and width as follows:

If a new stroke S begins to the right of the end position P of all previous strokes in the current collection and no subsequent stroke begins to the left of this stroke, consider this the left hand edge of the current character. P is the right-hand edge of the previous character and S is the left-hand edge of the current character. When you have a left-hand edge and a right-hand edge of a, character, use it to recompute the average character width with for example, ⅓ of the difference. Recompute the average character height by subtracting the lower bound from the upper and lower bound of all strokes in the previous collection and adding a fraction of the difference between the old character height and the new character height to the old character height.

When condition 1) or 2) above has been met:

Close the current collection and designate it as the previous collection. If the current stroke falls inside the bounding box of any previous collection, reopen that collection and make it the current collection but disable recalculation of average character height and width within this collection, otherwise, if the current stroke does not fall inside the bounding box of a previous collection, create a new stroke collection and begin adding strokes to this collection as before.

Once the collection of strokes has been closed, a box is defined which is the bounding box of all points in the collection of strokes. This bounding box may then be compared with boxes representing the fields of different forms to find the boxes that most closely match it. One embodiment of the form identification procedure finds the page for which the total distance between the corners of these bounding boxes and the field boxes on the form template is at a minimum. The following improvement defines a different method of form identification. Since the box surrounding the handwritten text may frequently be larger than the form field because tall characters or characters with descenders, such as g or q, will frequently stray outside the bounding box of the entry field. For this reason it would be good to have a box representing the text which would not extend beyond the edges of the field even if the user's writing occasionally strays outside of that region.

Figure 6A:
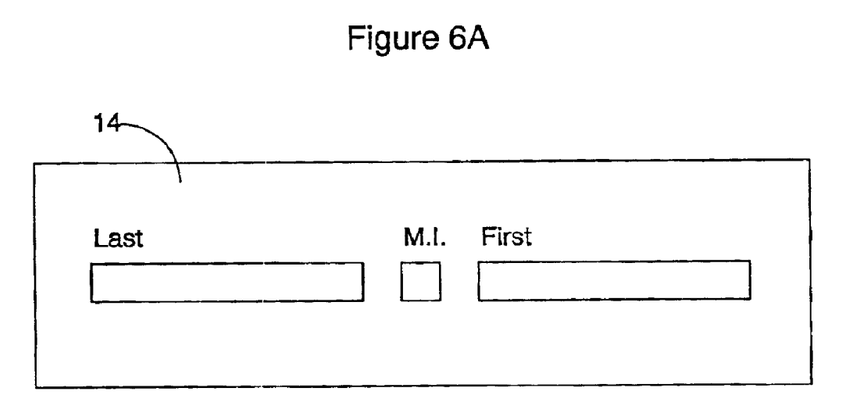
FIGS. 6A–B illustrates a preferred embodiment in which the standard deviation is used to define a text box.
Figure 6B:
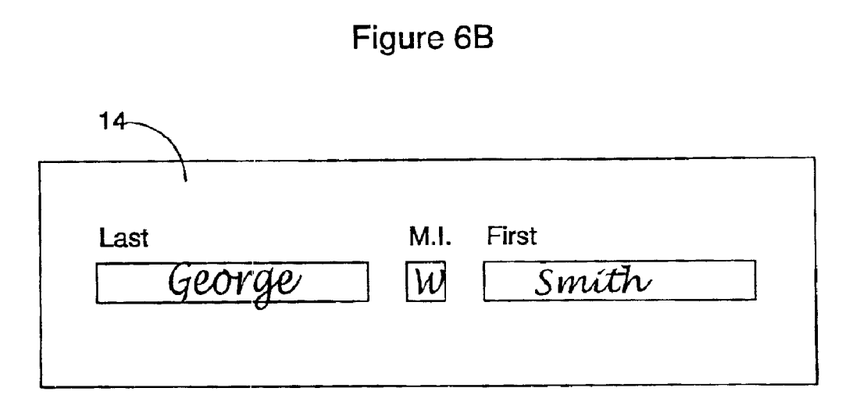

The present embodiment calculates the average horizontal line above and below which the writing is formed and considers the box which extends one standard deviation in above and below this average value, where the standard deviation is defined by the vertical positions of all of the other points in the stroke collection for this isolated block of writing. This is illustrated by FIGS. 6A–B. In FIG. 6A, a portion 14 of a form is illustrated which shows the locations of data entry fields. In FIG. 6B, handwritten text is shown written in the data entry fields of the portion 14 of a form. This can be seen in this figure, the lower case letter "g" has a descender which extends below its data entry field.

For a given collection of points, this embodiment calculates a box whose right and left edges are defined by the minimum and maximum X values of the data and whose top edge is defined by the average Y value of the input data plus one standard deviation of the Y values and the bottom edge is defined by the average value of Y minus the standard deviation. In the preferred embodiment, the height of the box is twice the standard deviation. However, those skilled in the art will recognize that this height can also be computed as a fraction of the standard deviation, a multiple of the standard deviation, or a different function of the variation of Y values.

The next step is to identify fields on the forms. A form is a set of scanned images, each representing one page of the form. For each page of the form, find the complete set of the largest rectangular boxes that contain no black pixels. This algorithm includes a threshold allowing it to ignore isolated islands of a few pixels that may be due to dirt on the scanner, stray marks on the form, etc.

Once the form fields are identified, the next step is to match data to the form fields. This operation matches the bounding boxes of stroke collections (as described above) with bounding boxes of fields on the forms. For a given set of raw data (e.g. a file of ink stroke data), it is assumed that all matched fields will belong to a single form.

An alternative method of associating pen stroke data with the correct form is to perform a boolean AND operation on the bitmap representing the empty form and a bitmap representing the user input data. Since the user entered data should always appear over the white spaces on the form and never (or rarely) over printing or lines on the form, the user data page which has the least number of overlapping bits with a given form page is a likely candidate for that form page. In particular, if the sum of overlapping bits for the complete set of user input pages (in order) when ANDed with the set of pages for a given form is minimum, that is the correct form.

By way of example, assume that we have three pages of writing (P1, P2, P3) with two writing segments (S1, S2) that may belong to one or more pages (S1, S2 may be on any one of the pages P1, P2, or P3). Further assume that there are 10 possible forms, of which 1–6 are three-page forms, 7–8 are two-page forms, and 9–10 are four-page forms. A comparison would be made between each page of writing with and without each of the two segments S1 and S2, to each of the corresponding pages of the three page forms. The assignment which produces the minimum number of overlapping pixels consists of matching P1 with Form 3 Page 1, matching P2 plus the writing segment S1 matching Form 3 Page 2, and P3 plus the writing segment S2 matching Form 3 Page 3.

Assignments are only considered when all stray segments are accounted for (that is, S1 and S2 have been added to some pages and the bitmap's overlaps are still minimal), the sequence of input data pages (P1, P2, P3) is matched with the corresponding sequence of form pages (Page 1, Page 2, Page 3) and all of these pages come from the same form. For example, even if the data P2 and P3 gave zero overlapping bits when compared with Form 4 Page 2 and Form 4 Page 3, comparing P1 with the first page of Form 4 could still add enough overlapping bits so that the data/form match is not as good as another assignment.

Another important concern when implementing this system is related to page misalignment. This problem is minimized as follows. For every data/form page comparison, the user input bitmap should be shifted by small amounts in the X and Y directions and rotated slightly in either direction in order to find an alignment that produces the minimum number of bits overlapping. Thus each page can have a separate alignment and still match the form correctly.

In the event of ambiguity, a Page at a Time Matching with Backtracking Method is used. Because the segments of stroke data may not accurately be assigned to pages in one pass. A set of possible stroke-data to page assignments is maintained and each one is considered in turn using the Page at a Time Matching with Backtracking Method. For each assignment of ambiguous stroke data to a given page, the matches of that page are considered against stroke data that keep the minimum overlap value. If more than one assignment results in a zero overlap value these page assignment alternatives are indistinguishable and it will be necessary to flag this data set for human analysis.

This system does not assume that a person will begin writing a text segment on one page, stop writing, flip to another page and pick up writing immediately to the right of the original text segment. Therefore, this situation may cause a data set to be rejected by the automatic form identification.

Figure 4:
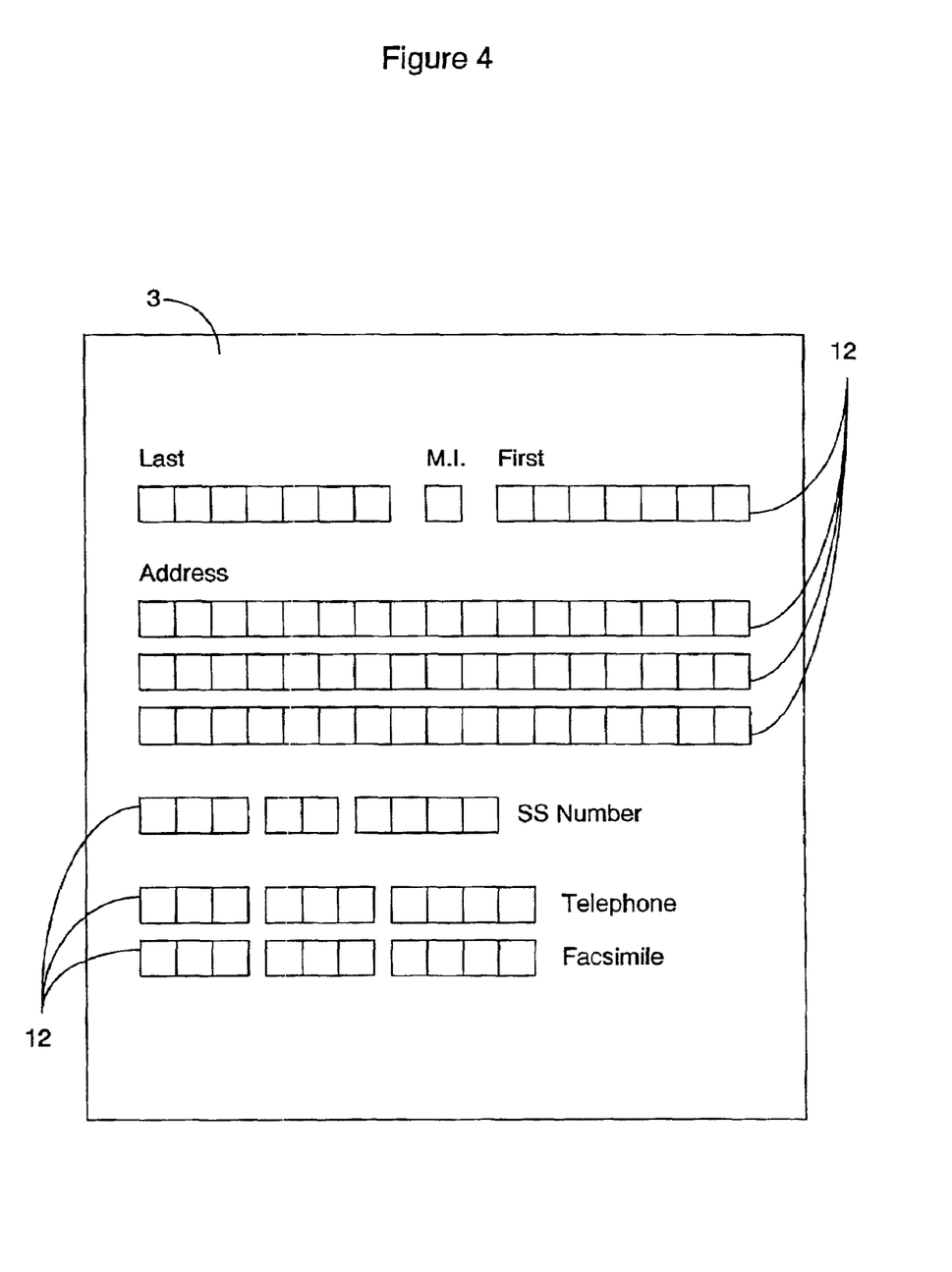
FIG. 4 illustrates a form layout which has data entry locations specifically designed for use with scanning, devices.

Those of skilled in the art will recognize that a small set of working forms will reduce the chance of ambiguity. As the size of the working set of forms increases, the chances for ambiguity increase. As a result, when working with large sets of forms, it is important to design the forms to reduce overlap among fields in order to reduce ambiguity. FIG. 4 illustrates an example of placing fields on a specific location of a form 3. The fields 12 on form 3 can be positioned so that any other form in the set of possible forms will not have long text fields in the same location as on this form, thereby reducing form ambiguity.

The electronic capture of form data and its combination with an electronic form is preferably transparent to the user. If pen device 8 is an electronic pen that also writes in ink on the paper form, data can be captured when the user is filling out a paper form without requiring any additional effort from the user. In fact, the user might even be unaware that the tablet computer 2 is an electronic device. For example, as an untrained user fills out a paper form attached to its surface, digitizing device 5 captures pen stroke data without the user's knowledge. The sequence and location of the raw pen-stroke data is analyzed to determine which form was filled out and which field on each page was the intended field for the subsets of stroke data. The form/field identification method allows one to use the tablet computer 2 as if it were an ordinary clipboard. An individual can select one of several multi-page forms, attach it onto the clipboard without any special attention to its positioning, fill out fields in any order, skipping between pages at will, leaving fields blank, etc. and having no other interaction with the tablet computer 2.

Figure 5A:
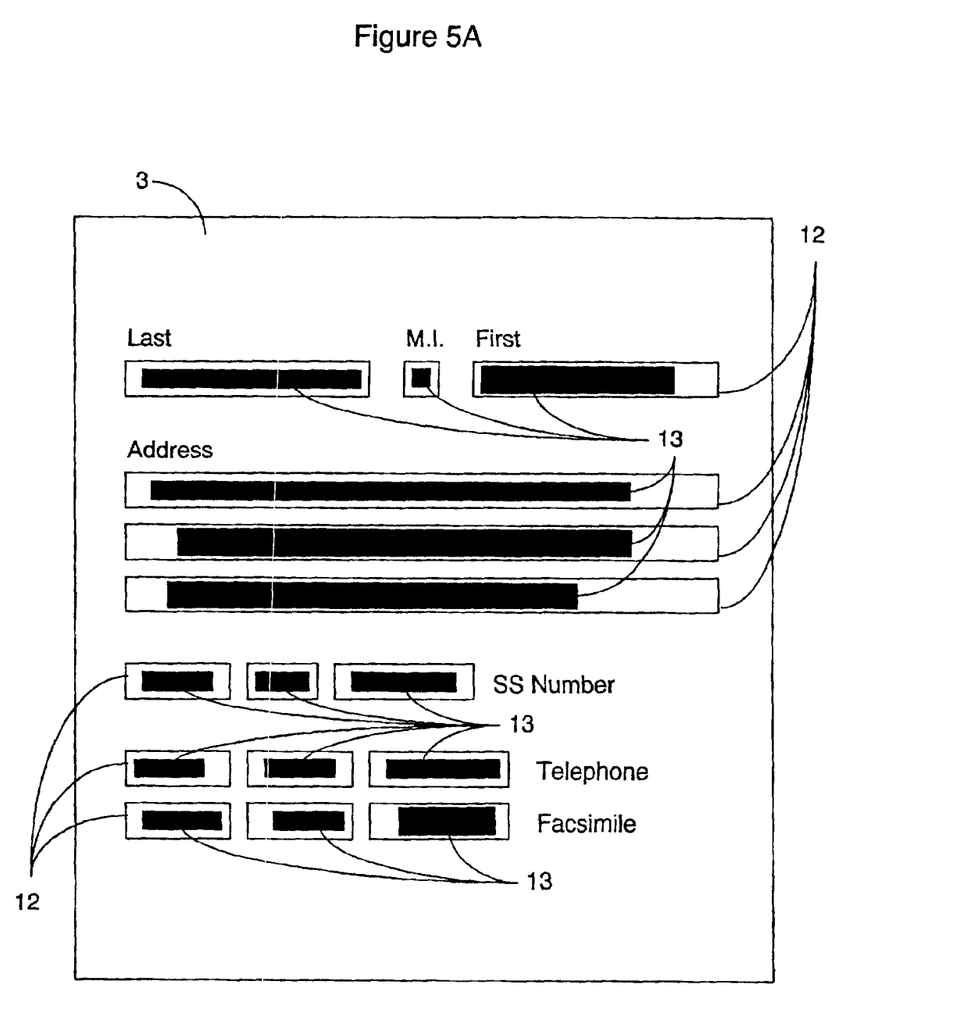
FIGS. 5A–B illustrates a preferred embodiment in which non-used portions of the form are blocked out to improve field recognition.
Figure 5B:
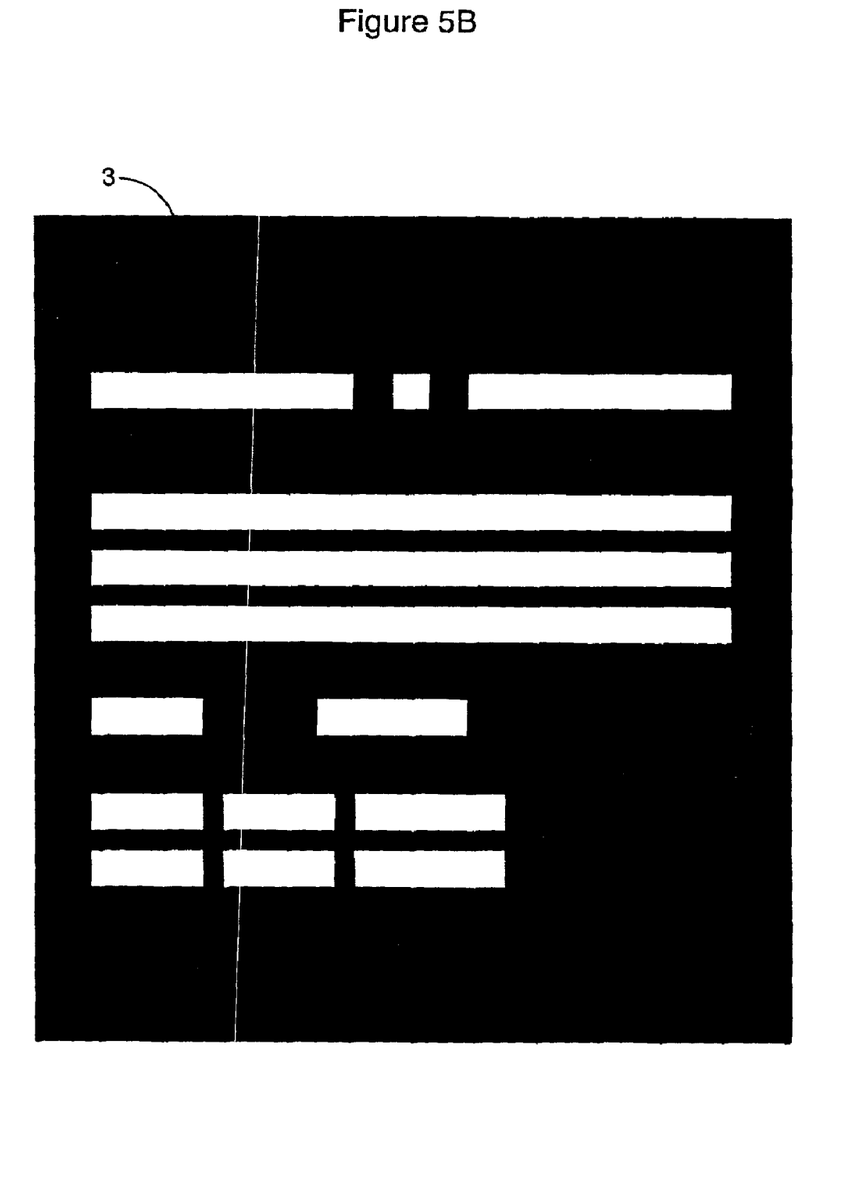

In FIGS. 5A–B, another preferred embodiment is illustrated which improves field recognition. Form field identification can be improved by matching the input data against specially modified versions of the form in which all of the forbidden regions (where user input should not appear) are completely blacked out. In FIG. 5A, the form 3 is shown which has boxes 12 designed to hold raw data 13 (handwriting entries). To improve recognition of forbidden areas, FIG. 5B illustrates a form 3 in which the forbidden areas are blacked out. By using this template, the bitmap AND comparison will produce many more overlapping pixels and more easily identify inappropriate data field assignments. The result of ANDing these templates with the average data regions will still produce few or zero overlapping pixels for the correct form, but much greater numbers of overlapping pixels for incorrect forms.

While the invention has been described with respect to a preferred embodiment thereof, it will be understood by those skilled in the art that various changes in detail may be made therein without departing from the spirit, scope, and teaching of the invention. For example, the software platform may be anything suitable for pen-based computers, the type of output device used to indicate status can vary, etc. Accordingly, the invention herein disclosed is to be limited only as specified in the following claims.

We claim:

1. A system for automatically identifying a form or a page in multi-page form, comprising:
    a digitizing pen;
    a digitizing tablet, further comprising:
        a support surface for supporting a form; and
        means to detect pen stroke data when the digitizing pen is used to enter data in data entry fields on the form placed on the support surface, said pen stroke data having content information that is information requested by the form and location information that indicates the location on the form where the pen stroke data was entered; and
    form selection means to select an electronic bit image of the form which data was entered on by the digitizing pen by selecting the best match of the location information of the pen stroke data, indicating the location on the form where the pen stroke data was entered, with automatically determined location of a data entry field boundary of each of at least one data entry field in an electronic bit image of at least one form;
    whereby the system can be used to automatically identify a form being used based on the location information of the pen stroke data.

2. A system, as in claim 1, wherein
    the form selection means compares the location of a pen stroke data boundary defined by the location information from the pen stroke data with the automatically determined location of a data entry field boundary of each of at least one data entry field in the electronic bit image of the at least one form, and selects the electronic bit image of one of the at least one form by selecting the best match of the location of the pen stroke data boundary with the automatically determined location of the data entry field boundary of one of the at least one data entry field in the electronic bit image of the one of the at least one form;
    whereby the electronic form bit image is selected by determining the location of data entered on the form.

3. A system, as in claim 1, wherein:
    each form used by the system has data entry fields in different locations on the form; and
    the form selection means distinguishes between forms by comparing the location information of the pen stroke data with the unique location of the automatically determined location of the data entry field boundary of each of the data entry fields in individual electronic bit images of forms;
    whereby the selection of an electronic bit image of a form is made more fault tolerant by placement of data entry fields on different forms in disparate locations.

4. A system for automatically identifying a form or a page in multi-page form, comprising:
    a digitizing pen;
    a digitizing tablet, further comprising:
        a support surface for supporting a form; and
        means to detect pen stroke data when the digitizing pen is used to enter data in data entry fields on the form placed on the support surface, said pen stroke data having content information that is information requested by the form and location information that indicates the location on the form where the pen stroke data was entered; and
    form selection means to select an electronic image of the form which data was entered on by the digitizing pen by selecting the best match of the pen stroke data with the electronic images of the forms;
    whereby the system can be used to automatically identify the form being used based on the pen stroke data; and
    wherein the form selection means compares the location information from the pen stroke data with the location of data entry fields on forms, and selects the electronic image of the form related to the form on which the data was entered by selecting the best match of the location information with the location of the data entry fields on the electronic images of the forms; whereby the electronic form image is selected by determining the location of data entered on the form; and further comprising:
    means to calculate a data bounding box by identifying a discrete block of writing in the pen stroke data;
    means to calculate a field bounding box for each data entry field on each form;
    means to compare the distances between the corners of the data bounding box and the corners of the field bounding boxes; and
    means to select the electronic image of the form which has the minimum distances between the corners of the data bounding box and the corners of the field bounding boxes;
    whereby an electronic image of a form is selected based on the proximity and overlap of the data bounding box and the field bounding box.

5. A system, as in claim 4, further comprising:
    means to select, when the data bounding box and the field bounding box do not overlap, the field bounding box which most closely matches the data bounding box;

whereby the system automatically compensates for form registration irregularities by selecting the best match of potential field bounding boxes for a given data bounding box.

6. A system, as in claim 4, further comprising:

means to limit initial comparisons of data bounding boxes and field bounding boxes to data bounding boxes and field bounding boxes in the same region of the form;

whereby the selection of an electronic image of a form is completed more rapidly by limiting the initial comparison of the data bounding box and the field bounding boxes to a preselected geographic area of the form.

7. A system, as in claim 4, further comprising:

means to limit comparisons of subsequent data bounding boxes, once a previous data bounding box and field bounding box have been matched, to field bounding boxes in the form if the subsequent data bounding box is located to the right or below the previous data bounding box;

whereby the selection of an electronic image of a form is completed more rapidly by temporarily limiting the comparison of subsequent data bounding boxes to field bounding boxes on the same form.

8. A system, as in claim 4, further comprising:

means to select the next page of a multi-page form as the initial candidate for comparison when a subsequent bounding box is above the previously matched data bounding box and field bounding box;

whereby the selection of an electronic image of a form is completed more rapidly by comparing subsequent higher location data bounding boxes to field bounding boxes on the next page of a form.

9. A system, as in claim 4, further comprising:

means to select a particular electronic image of a form, when several forms are potential matches, by selecting the electronic image of the form with the most matches of data bounding boxes and field bounding boxes;

whereby the selection of an electronic image of a form is made by choosing the electronic image of the form with the most data bounding box/field bounding box matches.

10. A system, as in claim 4, further comprising:

means to determine the boundary of a data bounding box by setting the beginning of a data bounding box by detecting the initial pen stroke data, setting the end of a data bounding box by detecting the last pen stroke data, determining the vertical midpoint of the pen stroke data, and setting the height of the data bounding box to define an area above and below the midpoint of the pen stroke data which includes a substantial portion of the pen stroke data.

11. A system, as in claim 10, wherein:

the height of the data bounding box is approximately one standard deviation from the midpoint of the pen stroke data.

12. A system, as in claim 10, wherein:

the height of the data bounding box is approximately a fraction of, or a multiple of, a standard deviation from the midpoint of the pen stroke data.

13. A system, as in claim 4, further comprising:

means to generate a binary bitmap of data representing the pen stroke data;

comparison means to compare the binary bitmap of data from the pen stroke data with a binary bitmap of each page of an electronic image of a form, wherein the input fields of the electronic image of the form have no pixels and the non-input fields of the forms have pixels; and means for selecting the best match between the pen stroke data and the electronic image of the form by identifying the form page that has the least number of overlapping pixels.

14. A system, as in claim 1, wherein:

the form selection means determines whether the content information from the pen stroke data contains content identifiable data unique to a particular form, and selects the electronic image of the form related to the form on which the pen stroke data was entered when content identifiable data is present;

whereby the electronic form bit image is selected by detecting that content identifiable data was entered on the form.

15. A method of automatically identifying a form or a page in multi-page form, including the steps of:

using a digitizing pen and a digitizing tablet to generate pen stroke data when data is entered in data entry fields on a form, the pen stroke data including location information that indicates the location on the form where the pen stroke data was entered; and using the pen stroke data to select an electronic bit image of the form on which the pen stroke data was entered by selecting the best match of the location information of the pen stroke data indicating the location on the form where the pen stroke data was entered, with automatically determined location of a data entry field boundary of each of at least one data entry field in an electronic bit image of at least one form;

whereby the method can be used to automatically identify the form being used based on the location information of the pen stroke data.

16. A method, as in claim 15, including the additional steps of:

comparing the location of a pen stroke data boundary defined by the location information of the pen stroke data with the automatically determined location of a data entry field boundary of each of data entry fields in electronic bit images of a plurality of forms to determine a best match; and selecting the electronic bit image of the form based on the best match;

whereby the electronic form bit image is selected by determining the location of data entered on the form.

17. A method, as in claim 15, wherein data entry fields on each form have been located in different locations, and the method including the additional steps of:

selecting one of the forms by comparing the location information of the pen stroke data with the unique location of the automatically determined location of the data entry field boundary of each of the data entry fields in the bit image of the at least one form;

whereby the selection of an electronic bit image of a form is made more fault tolerant by placement of data entry fields in disparate locations on different forms.

18. A method of automatically identifying a form or a page in multi-page form, including the steps of:

using a digitizing pen and a digitizing tablet to generate pen stroke data when data is entered in data entry fields on a form;

using the pen stroke data to select an electronic image of the form on which the pen stroke data was entered by selecting the best match of the pen stroke data with data entry fields on the electronic images of the forms; whereby the system can be used to automatically identify the form being used based on the pen stroke data;

including location information in the pen stroke data when the pen stroke data is generated;

comparing the location information with the location of data entry fields on electronic images of the forms to determine a best match;

selecting the electronic image of the form based on the best match; whereby the electronic form image is selected by determining the location of data entered on the form;

identifying a discrete block of writing in the pen stroke data and calculating a data bounding box defining the discrete block of data;

calculating a field bounding box for each data entry field on each form; and comparing the distances between the corners of the data bounding box and the corners of the field bounding boxes, and selecting the electronic image of the form which has the minimum distances between the corners of the data bounding box and the corners of the field bounding boxes;

whereby an electronic image of a form is selected based on the proximity and overlap of the data bounding box and the field bounding box.

19. A method, as in claim 18, including the additional steps of:

determining when the data bounding box and the field bounding box do not overlap; and selecting the field bounding box which most closely matches the non-overlapping data bounding box;

whereby the method automatically compensates for form registration irregularities by selecting the best match of potential field bounding boxes for a given data bounding box.

20. A method, as in claim 18, including the additional step of:

limiting initial comparisons of data bounding boxes and field bounding boxes to data bounding boxes and field bounding boxes in the same region of the form;

whereby the selection of an electronic image of a form is completed more rapidly by limiting the initial comparison of the data bounding box and the field bounding boxes to a preselected geographic area of the form.

21. A method, as in claim 18, including the additional step of:

limiting comparisons of subsequent data bounding boxes, once a previous data bounding box and field bounding box have been matched, to field bounding boxes in the form if the subsequent data bounding box is located to the right or below the previous data bounding box;

whereby the selection of an electronic image of a form is completed more rapidly by temporarily limiting the comparison of subsequent data bounding boxes to field bounding boxes on the same form.

22. A method, as in claim 18, including the additional step of:

selecting the next page of a multi-page form when a subsequent bounding box is above the previously matched data bounding box and field bounding box;

whereby the selection of an electronic image of a form is completed more rapidly by comparing subsequent higher location data bounding boxes to field bounding boxes on the next page of a form.

23. A method, as in claim 18, including the additional step of:

selecting, when several forms are potential matches, the electronic image of the form with the most matches of data bounding boxes and field bounding boxes;

whereby the selection of an electronic image of a form is made by choosing the electronic image of the form with the most data bounding box/field bounding box matches.

24. A method, as in claim 18, including the additional steps of:

setting the left edge of a data bounding box at the approximate left edge of the pen stroke data;

setting the right edge of a data bounding box at the approximate right edge of the pen stroke data;

determining the vertical midpoint of the pen stroke data, and setting the height of the data bounding box to define an area above and below the midpoint of the pen stroke data which includes a substantial portion of the pen stroke data; and setting the data bounding box to match the left edge, the right edge, and the height above and below the midpoint of the pen stroke data;

whereby the size and location of the data bounding box is determined.

25. A method, as in claim 24, including the additional step of:

setting the height of the data bounding box to approximately one standard deviation from the midpoint of the pen stroke data.

26. A method, as in claim 24, including the additional step of:

setting the height of the data bounding box to approximately a fraction of, or a multiple of, one standard deviation from the midpoint of the pen stroke data.

27. A method, as in claim 15, including the additional steps of:

detecting content information in the pen stroke data; and selecting the electronic bit image of the form related to the form on which the pen stroke data was entered when the electronic bit image of the form is intended to hold corresponding content identifiable data;

whereby the electronic form bit image is selected by detecting that content identifiable data was entered on the form.

28. A method of automatically identifying a form or a page in multi-page form, including the steps of:

using a digitizing pen and a digitizing tablet to generate pen stroke data when data is entered in data entry fields on a form;

using the pen stroke data to select an electronic image of the form on which the pen stroke data was entered by selecting the best match of the pen stroke data with data entry fields on the electronic images of the forms; whereby the system can be used to automatically identify the form being used based on the pen stroke data;

generating a binary bitmap of data from the pen stroke data;

comparing the binary bitmap of data from the pen stroke data with a binary bitmap of each page of an electronic image of a form, wherein the input fields of the electronic image of the form have no pixels and the non-input fields of the forms have pixels; and selecting the best match between the pen stroke data and the electronic image of the form by identifying the form page that results in the least number of overlapping pixels between the pen stroke, data and the electronic image of the form.

29. A method of identifying a form from a pen stroke data that is generated when filling out that paper form, including the steps of:

placing a paper form on a digitizing tablet;

capturing pen stroke data using a digitizing pen;

isolating the pen stroke data into groups separated by the time at which the marks were made, their location on the page of the form, and the proximity of the pen stroke data to other pen stroke data on the page;

matching each isolated group of pen stroke data to a field on one of a set of electronic image of the forms by minimizing the distance between the corners of a box delimiting the isolated group of pen stroke data and the corners of a box delimiting the fields on each electronic image of the form; and selecting an electronic image of the form for which the combined distances between the corners of the group of pen stroke data and the fields are a minimum.

30. A method, as in claim 29, including the additional steps of:

optimizing the matching of each isolated group of pen stroke data by comparing the groups created at the earliest times with the first fields in the electronic image of the form; and comparing fields near the top of the following page with pen stroke data when the pen stroke data that immediately follow previously entered pen stroke data at the bottom of the form and overlap previously entered pen stroke data which have been matched to fields on the page of the form.

31. A method, as in claim 29, including the additional steps of:

examining isolated groups of pen stroke data to determine if the distance between them is less than a preselected numerical threshold; and categorizing the pen stroke data as a single group of pen stroke data if the distance does not exceed the preselected numerical threshold, and categorizing the pen stroke data as separate groups of pen stroke data if the distance exceeds the preselected numerical threshold.

32. A method, as in claim 29, including the additional steps of:

aligning the pen stroke data by defining a box delimiting the isolated group of pen stroke data; and rotating the pen stroke data used to generate the box to minimize the distance between its corners and the corners of a field delimiting box and applying this rotation to other groups of pen stroke data before computing their boundary boxes;

whereby the misalignment of the printed form upon the writing surface is corrected by rotating the pen stroke data prior to computing the boundary boxes to minimize distance between the corners of the boxes.

33. A method, as in claim 29, including the additional step of:

increasing the accuracy of form selection by ensuring that fields on different pages do not have exactly the same position and/or size on other pages.

34. A method, as in claim 29, including the additional steps of:

determining via handwriting recognition if pen stroke data contains content identifiable data; and selecting an electronic image of a form based on the presence of absence of the content identifiable data.

35. A method, as in claim 29, including the additional steps of:

generating a binary bitmap of data from the pen stroke data;

comparing the binary bitmap of data from the pen stroke data with a binary bitmap of each page of an electronic image of a form, wherein the input fields of the electronic image of the form have no pixels and the non-input fields of the forms have pixels; and selecting the best match between the pen stroke data and the electronic image of the form by identifying the form page that has the least number of overlapping pixels.

36. A method, as in claim 35, including the additional steps of:

using a boolean AND operation to compare the bitmaps of the pen stroke data and the electronic image of the form.

* * * * *